US006819022B2

United States Patent
Yamamoto et al.

(10) Patent No.: US 6,819,022 B2
(45) Date of Patent: Nov. 16, 2004

(54) BRUSHLESS MOTOR FOR POWER TOOL

(75) Inventors: Hirokatsu Yamamoto, Anio (JP);
Simoru Otogao, Yamanashi (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 10/449,331

(22) Filed: May 29, 2003

(65) Prior Publication Data

US 2004/0017119 A1 Jan. 29, 2004

(30) Foreign Application Priority Data

May 30, 2002 (JP) ........................................ 2002-158156

(51) Int. Cl.$^7$ ........................ H02K 21/14; H02K 11/00; H02K 9/06
(52) U.S. Cl. ............................ 310/156.05; 310/156.06; 310/68 B; 310/62; 310/63
(58) Field of Search ................................ 310/68 B, 58, 310/60 R, 62, 63, 156.05, 156.06; 417/356, 436, 410.2

(56) References Cited

U.S. PATENT DOCUMENTS

| 5,522,712 | A | * | 6/1996 | Winn .......................... 417/436 |
| 5,866,961 | A | * | 2/1999 | Suzuki et al. .............. 310/67 R |
| 6,194,798 | B1 | * | 2/2001 | Lopatinsky ................... 310/63 |
| 6,249,071 | B1 | * | 6/2001 | Lopatinsky et al. ... 310/156.38 |
| 6,543,549 | B1 | * | 4/2003 | Riedl et al. .................. 173/216 |

FOREIGN PATENT DOCUMENTS

| JP | 56-129864 | 10/1981 |
| JP | 60-176439 | 8/1985 |
| JP | 62-14196 | 1/1987 |
| JP | 62-091697 | 4/1987 |
| JP | 62-237097 | 10/1987 |
| JP | 1-58166 | 4/1989 |
| JP | 2-18691 | 5/1990 |
| JP | 08-275483 | 10/1996 |

* cited by examiner

*Primary Examiner*—Tran Nguyen
(74) *Attorney, Agent, or Firm*—Orrick, Herrington & Sutcliffe LLP

(57) ABSTRACT

It is an object of the present teachings to provide a technique that rationalizes the structure of the brushless motor so as to save space in the power tool. According to the present teachings, a representative brushless motor utilized in a power tool may comprise a stator, a rotor and a cooling fan. The brushless motor is disposed within the power tool. The brushless motor is adapted to supply driving current to the stator to drive a tool bit of the power tool by rotating the rotor. The cooling fan is molded of a magnetic or conductive material so that the cooling fan also serves as a rotating position detector that detects the rotating position of the rotor with respect to the stator. Because the cooling fan may also have a function of rotating position detector of the rotor, the inner space of the power tool can be rationalized.

15 Claims, 3 Drawing Sheets

BRUSHLESS MOTOR FOR POWER TOOL

BACKGROUND OF THE INVENTION

1. Field of the Invention

The present invention relates to a brushless motor for a power tool, and more particularly, to a technique that is useful to rationalize the structure of the motor of the power tool.

2. Description of the Related Art

A power tool often utilized a motor that is driven by a DC power due to its high efficiency and high output. As for a DC motor, generally, a DC motor that includes a brush and a commutator or a brushless motor that does not include a brush and a commutator is known. A brushless motor is also referred to as a DC brushless motor or a direct current brushless motor. A brushless motor typically uses a permanent magnet in the rotor and a coil in the stator. Therefore, it is not necessary to provide a brush and a commutator. Thus, the motor can be smaller and simpler in structure.

Generally, a brushless motor includes a device for cooling the brushless motor and a rotating position detecting device for detecting the rotating position of the rotor with respect to the stator. On the other hand, the brushless motor is required to have an arrangement and configuration to save space in the power tool.

SUMMARY OF THE INVENTION

It is, accordingly, an object of the present teachings to provide a technique that rationalizes the structure of the brushless motor so as to save space in the power tool.

According to the present teachings, a representative brushless motor utilized in a power tool may comprise a stator, a rotor and a cooling fan. The brushless motor is disposed within the power tool. The brushless motor is adapted to supply driving current to the stator to drive a tool bit of the power tool by rotating the rotor. The cooling fan is molded of a magnetic or conductive material so that the cooling fan also serves as a rotating position detector that detects the rotating position of the rotor with respect to the stator. Because the cooling fan may also have a function of rotating position detector of the rotor, the inner space of the power tool can be rationalized.

Other objects, features and advantages of the present invention will be readily understood after reading the following detailed description together with the accompanying drawings and the claims.

DETAILED DESCRIPTION OF THE INVENTION

Figure 1:
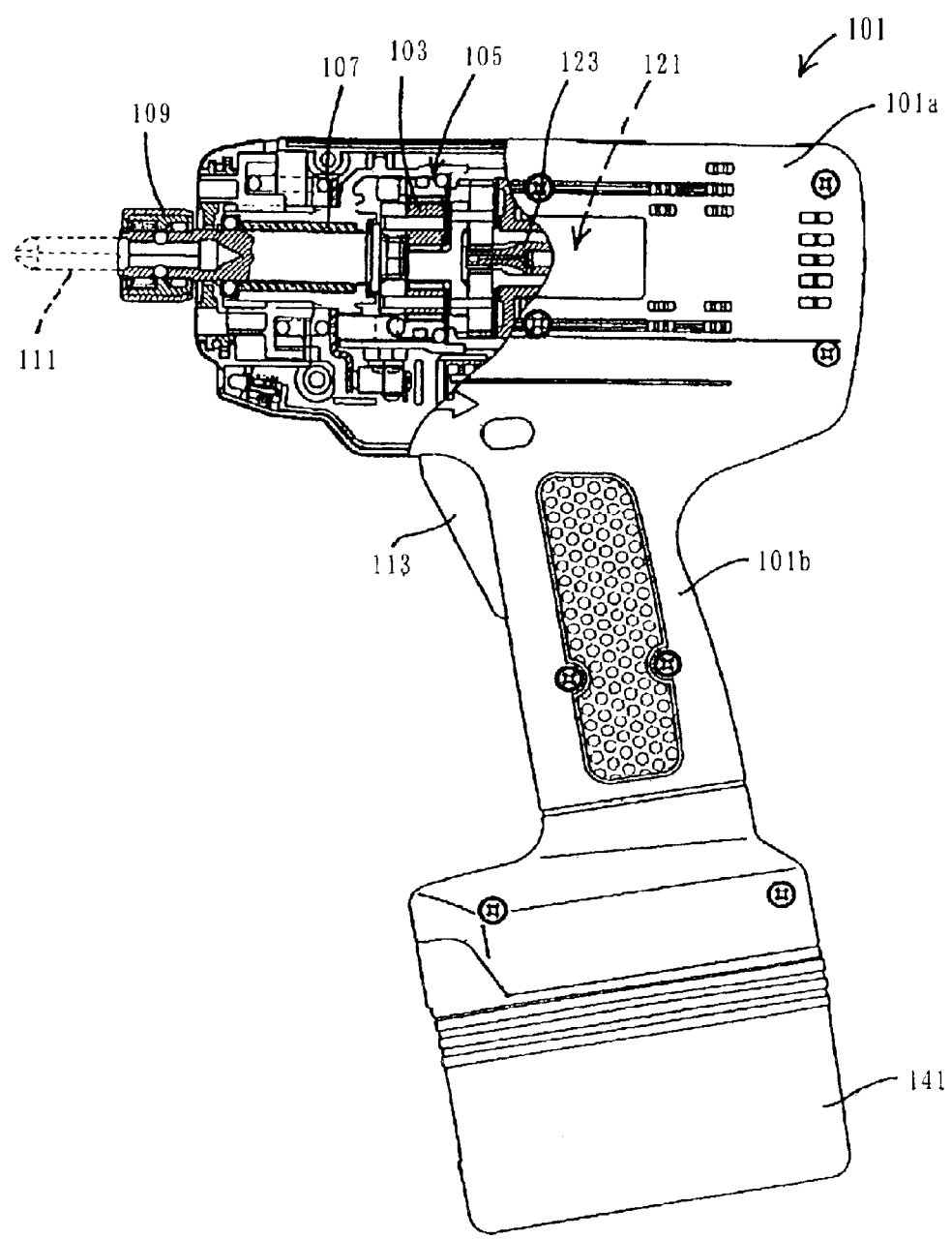
FIG. 1 is a screwdriver according to a representative embodiment of the invention.

In accordance with the present teachings, a representative brushless motor may include a stator and a rotor. The brushless motor may be disposed within the power tool and adapted to supply driving current to the stator so as to rotate the rotor. By the rotation of the rotor, the brushless motor may drive the tool bit for performing a predetermined operation. The brushless motor further comprises a cooling fan to be rotated.

As for the "power tool" and the "tool bit for performing a predetermined operation" according to the present teachings, power tools, such as drills, grinders, impact drivers, impact wrenches, cutters, trimmers, circular saws, and reciprocating saws, and any type of bits that can be mounted to these power tools may be embraced. As for the "cooling fan", preferably, it may be fitted around the drive shaft of the brushless motor and rotated coaxially with the drive shaft as the drive shaft rotates.

The cooling fan of the brushless motor according to the present teachings may be molded of a magnetic material so that the cooling fan also serves as a rotating position detector for detecting the rotating position of the rotor with respect to the stator. For example, the cooling fan may preferably be molded of a predetermined magnetic material and configured to rotate together with the rotor. A Hall element may be provided on the stator near the cooling fan. Further, such a cooling fan may preferably be configured such that its polarity changes or that the magnetic flux density around the Hall element changes as the rotor rotates. With such construction, the Hall element on the stator can reliably detect the position of the rotor.

The cooling fan according to the present teachings may preferably be molded of a magnetic material or a conductive material in one piece. Thus, the productivity of the cooling fan can be improved. The cooling fan may be formed of a magnetic material alone or a conductive material alone or an appropriate mixture thereof. With such a cooling fan that is formed of a magnetic material or a conductive material, it is not necessary to separately provide a magnetic material facing the Hall element in order to detect the relative positional relationship between the rotor and the stator. The cooling fan can also serve as a detector for detecting such positional relationship. Therefore, when this brushless motor is used to drive a tool bit in a power tool, the cooling device for the brushless motor can also serve as a detecting device for detecting the rotating position of the rotor with respect to the stator. Thus, the inner space of the power tool can be rationalized.

Preferably, the cooling fan may be injection molded of a resin mixed with a magnetic material or a conductive material. The cooling fan that is formed mainly of a resin can be lighter in weight. Further, by injection molding the cooling fan of a resin mixed with a magnetic material or a conductive material, productivity can be improved and the manufacturing cost can be reduced compared with a motor, for example, in which a magnetic or conductive material is attached in post-processing to the cooling fan that has been molded of a resin.

A "resin mixed with a magnetic material or a conductive material" may typically comprise a resin mixed with a powdered or fibrous magnetic material or conductive material. A resin that is mixed with a magnetic material alone or a conductive material alone or mixed with the both at a predetermined ratio can be adapted.

Preferably, the brushless motor may further comprise a drive shaft that is coupled to the rotor and rotates together with the rotor. The cooling fan may be fitted around the drive shaft and rotates coaxially with the drive shaft. The cooling fan may include a plurality of fan blades that extend from the side of the cooling fan opposite to the rotor. When the cooling fan rotates, cooling air flow is generated in a direction away from the brushless motor. As a result, heat around the brushless motor can be deprived, so that the brushless motor is effectively cooled. Further, by such cooling air flow, dust and dirt within the brushless motor can also be discharged to the outside. Thus, dust and dirt within the brushless motor can be more effectively removed compared with a technique in which the wind from the cooling fan directly blows against the brushless motor to cool the motor.

According to the present teachings, a power tool may be provided which includes a brushless motor that has a substantially the same construction as the above-mentioned brushless motor according to the present teachings. The cooling fan serves not only to cool the brushless motor but also to detect the rotating position of the rotor with respect to the stator. As long as the cooling fan is ensured to perform the both functions, the position of the cooling fan is not restricted. For example, it may be disposed within or outside the housing of the brushless motor.

Each of the additional features and method steps disclosed above and below may be utilized separately or in conjunction with other features and method steps to provide improved brushless motor and method for using such brushless motor and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

FIG. 1 shows a screwdriver 101 according to a representative embodiment. The screwdriver 101 is a feature that corresponds to an example of the "power tool" of the present teachings. The screwdriver 101 may include a body 101*a* and a grip 101*b*. The body 101*a* may house a DC brushless motor 121, a motor drive shaft 123, a speed change mechanism 105 and a spindle 107. The speed change mechanism 105 mainly includes a planetary gear 103. A bit mounting chuck 109 and a driver bit 111 are mounted to the front end of the spindle 107. The driver bit 111 is a feature that corresponds to the "tool bit" according to the present teachings. A trigger switch 113 is provided on the upper end portion of the grip 101*b*. A battery 141 is detachably mounted on the lower end portion of the grip 101*b*.

Figure 2:
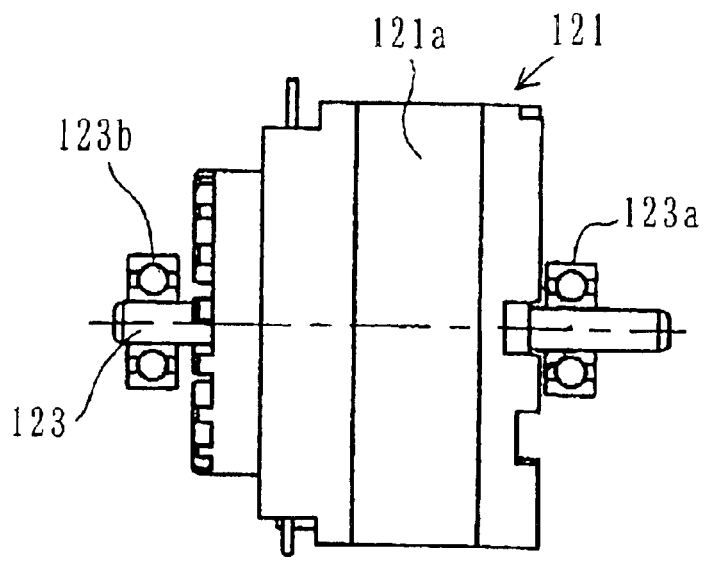
FIG. 2 is a front view of a brushless motor according to the representative embodiment.
Figure 3:
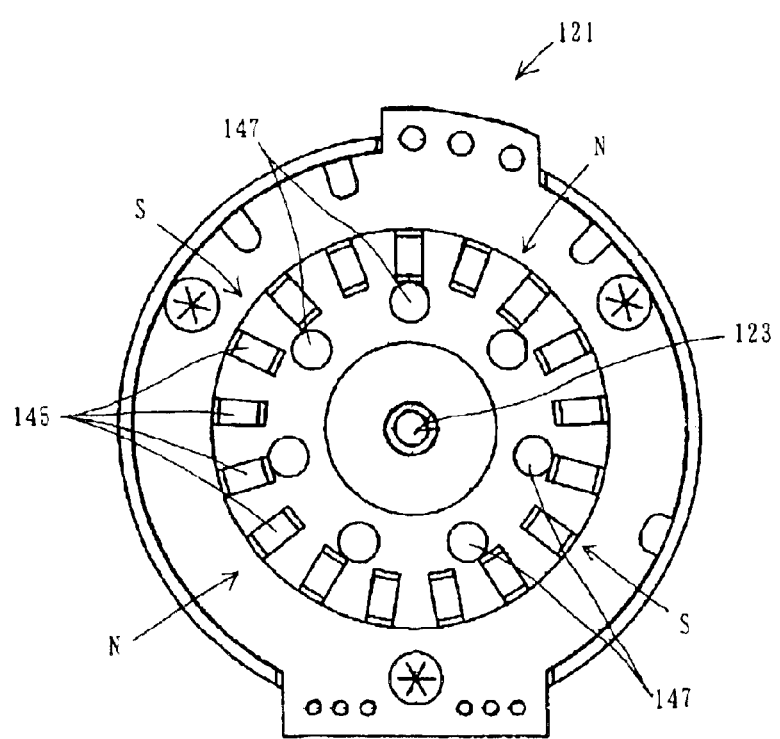
FIG. 3 is a left side view of the brushless motor as shown in FIG. 2.
Figure 4:
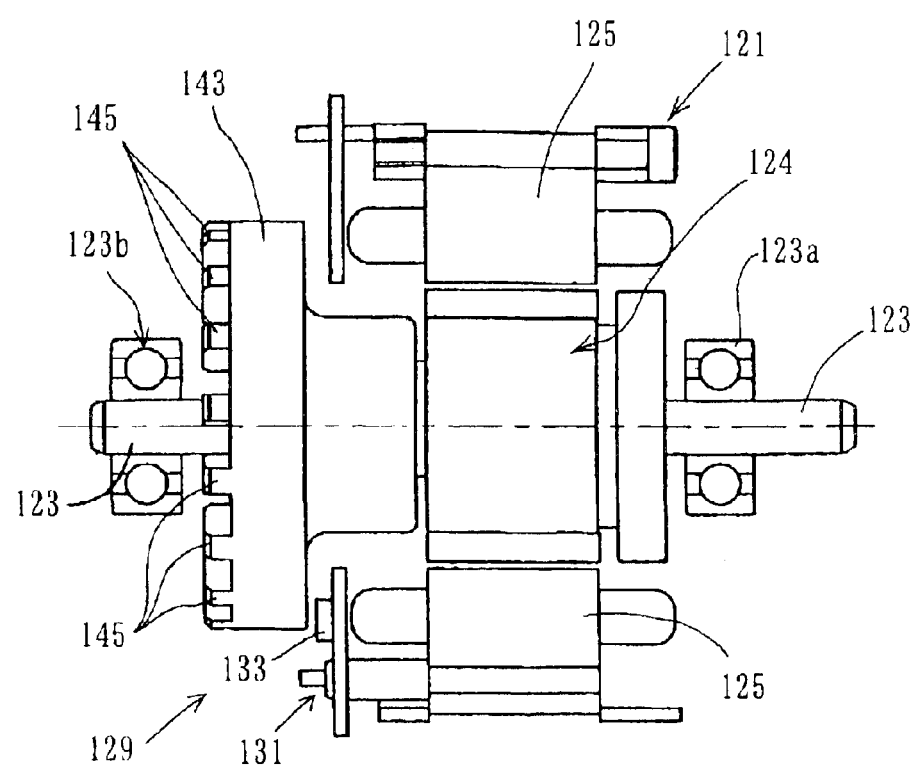
FIG. 4 shows essential components within the brushless motor as shown in FIG. 2.

FIGS. 2 and 4 respectively show a structure of the brushless motor 121 according to the representative embodiment. FIG. 2 is a front view of the brushless motor 121. FIG. 3 is a left side view of the brushless motor 121 as shown in FIG. 2. FIG. 4 shows main components within the brushless motor 121 as shown in FIG. 2. The brushless motor 121 according to the representative embodiment may include a rotor 124, a stator 125, a driving shaft 123 and a cooling fan for cooling the brushless motor 121. These components are disposed within a housing 101*a*.

Rotor 124 is magnetized at least on its outer peripheral portion. The rotor 124 is mounted to the drive shaft 123 and can rotate together with the drive shaft 123. The stator 125 is disposed to surround the rotor 124. Bearings 123*a*, 123*b* are disposed outside the housing 121*a* and on the both sides of the housing 121*a* and configured to journal the drive shaft 123. The stator 125 includes three-phase coils wound around a stator core which is not particularly shown in the drawings. As will be described later, winding current is sequentially supplied to each of the three-phase coils, which causes the rotor 124 to rotate. Thus, the brushless motor 121 is drivingly controlled.

Cooling fan 143 is coupled to the drive shaft 123 so as to be fitted around the drive shaft 123 and disposed adjacent to the rotor 124. The cooling fan 143 can rotate together with the drive shaft 123. A plurality of fan blades 145 are formed in the outer peripheral edge portion of the side (the left side as viewed in FIG. 4) of the cooling fan 143 opposite to the rotor 124. Further, a plurality of air holes 147 are formed radially inward of the fan blades 145 in the cooling fan 143 and around the drive shaft 123. The air holes 147 extend through the cooling fan 143 from one side of the cooling fan 143 which faces the rotor 124 to the other side remote from the rotor 124.

Cooling fan 143 according to the representative embodiment is injection molded of ferrite anisotropic nylon 6. The ferrite anisotropic nylon 6 is made by melting nylon 6 mixed with ferrite magnet powder. The cooling fan 143 that is injection molded of ferrite anisotropic nylon 6 is a feature that corresponds to the "cooling fan that is injection molded of a resin mixed with a magnetic material" according to the present teachings. When the cooling fan 143 is injection molded, the cooling fan 143 is fixedly coupled to the drive shaft 123 of the rotor 124 and then, putted in a predetermined magnetic field. Thus, as it is shown in FIG. 3, the cooling fan 143 is magnetized to the north and south poles (as shown by "N" and "S" in the drawing) alternately at 90° intervals in the circumferential direction (rotational direction). As a result, the cooling fan 143 serves to cool the brushless motor 121 and also serves as a sensor magnet which will be described later. Further, because the cooling fan 143 is magnetized after being coupled to the drive shaft 123, the cooling fan 143 and the rotor 124 are magnetized at the same time and therefore, the magnetic field defined by the north and south poles of the cooling fan 143 may precisely correspond to the magnetic field defined by the north and south poles of the rotor 124. That means that mutual positioning work is not required between the cooling fan 143 and the rotor 124 so as to have positional correspondence between the magnetic fields of rotor 124 and the cooling fan 143.

Brushless motor 121 uses a three-phase bipolar driving circuit. Specifically, the brushless motor 121 may be drivingly controlled based upon 120° energizing rectangular wave by using three Y-connected coils for driving the rotor 124. The phase sequence in energizing the three-phase coils in the stator 125 is appropriately changed to drivingly control the brushless motor 121. Therefore, it is necessary to sequentially detect the rotating position of the rotor 124 with respect to the stator 125 that includes coils. Specifically, in order to drivingly control the brushless motor 121, the rotating position of the rotor 124 with respect to the stator 125 having the three-phase coils is determined and each of the coils is selectively energized based on the determined relative rotating position of the rotor 124.

Therefore, in the brushless motor 121 according to the representative embodiment, a rotating position detector 129 is provided on the side of the stator 125 and on the side of the rotor 124 in order to detect the relative positional relationship between the rotor 124 and the stator 125 with respect to the rotational movement of the rotor 124. The rotating position detector 129 on the side of the stator 125 comprises a sensor substrate 131 and a Hall element 133 which are integrally formed with the stator 125. In the representative embodiment, the sensor substrate 131 and the Hall element 133 are formed in one piece as a hall IC. The hall IC outputs a detection signal of the rotating position of the rotor 124 by amplifying the output voltage of the Hall element 133 which is proportional to the magnetic flux density or by appropriately converting the output voltage into a switching output using a comparator.

The rotating position detector 129 on the side of the rotor 124 may be defined by the cooling fan 143. As it is mentioned above, the cooling fan 143 according to the representative embodiment is injection molded of ferrite anisotropic nylon 6 and then, magnetized together with the rotor 124 in a predetermined magnetic field after being coupled to the drive shaft 123. The cooling fan 143 is magnetized to the north and south poles alternately at 90° (90 degree) intervals in the circumferential direction. When the rotor 124 is rotated together with the drive shaft 123 and the cooling fan 143, the polarity of the cooling fan 143 close to the Hall element 133 alternately changes between the north pole and the south pole as the cooling fan 143 rotates. As a result, the magnetic flux density around the Hall element 133 changes. The Hall element 133 outputs a detected voltage in response to the change of the magnetic flux density. Thus, the relative positional relationship between the rotor 124 and the stator 125 can be detected by cooperation of the cooling fan 143, the Hall element 133 and the sensor substrate 131.

Operation of the screwdriver 101 and the brushless motor 121 will now be explained. When user of the screwdriver 101 operates a trigger switch 113 which is shown in FIG. 1, the brushless motor 121 is driven by the battery 141 that is used as a power source. More specifically, a driving control circuit, which is not particularly shown in the drawings, supplies driving current from the battery 141 to the coils of the respective phases in the stator 125, which causes the rotor 124 to rotate around the stator 125. When the rotor 124 rotates, the drive shaft 123 that is mounted to the rotor 124 also rotates. The rotational movement of the drive shaft 123 is transmitted to the spindle 107 while being appropriately decelerated by the speed change mechanism 105. When the spindle 107 is thus rotated, the driver bit 111 coupled to the bit mounting chuck 109 on the front end of the spindle 107 is also rotated. Thus, the screw tightening operation can be performed.

At this time, in the brushless motor 121, the cooling fan 143 that is fitted around the drive shaft 123 rotates together with the drive shaft 123. As the cooling fan 143 rotates, the fan blades 145 formed in the outer peripheral edge portion of the cooling fan 143 also rotate around the drive shaft 123. As the fan blades 145 rotate, heat around the rotor 124 and the stator 125 can be discharged to the outside of the housing 121a (see FIG. 2) of the brushless motor 121 through the air holes 147 formed in the cooling fan 143. Thus, the brushless motor 121 is effectively cooled. Further, at this time, dust and dirt within the housing 121a can also be discharged to the outside through the air holes 147. Therefore, advantageously, dust and dirt can be easily removed from the Hall element 133 and the sensor substrate 131.

Cooling fan 143 which rotates together with the drive shaft 123 also rotates with respect to the Hall element 133 that is integrally formed with the stator 125. As it is mentioned above, the cooling fan 143 is magnetized to the north and south poles alternately at 90° intervals in the circumferential direction. Therefore, when the rotor 124, drive shaft 123 and cooling fan 143 rotate together, the polarity of the cooling fan 143 near the Hall element 133 sequentially changes. As a result, the magnetic flux density around the Hall element 133 changes. The output voltage of the Hall element 133 then changes in response to the change of the magnetic flux density. The output voltage of the Hall element 133 is appropriately amplified in the sensor substrate 131 and outputted to the drive control circuit of the brushless motor 121 as a detection signal of the rotating position of the rotor 124. Energizing of the coils for each phase of the stator 125 is sequentially controlled based on the detection signal of the rotating position of the rotor 124. Thus, the rotor 124 is drivingly controlled.

Thus, according to the representative embodiment, the cooling fan 143 serves as a sensor magnet that defines the rotating position detector 129. Therefore, it is not necessary to separately provide a magnetic material facing the Hall element 133 in order to detect the relative positional relationship between the rotor 124 and the stator 125. Thus, the number of component parts of the screwdriver 101 can be reduced and inner space of the screwdriver 101 can be rationalized. Further, the screwdriver 101 can be more easily assembled and the manufacturing cost can be reduced.

Although, in the above-mentioned embodiment, the cooling fan 143 comprises a magnetic material, it may comprise a conductive material because the cooling fan 143 widely includes a device for changing the magnetic flux density around the Hall element 133. For example, the cooling fan 143 may be injection molded of a resin mixed with a conductive metal piece (powder) without having the action of magnetic field. Further, although, in the above-mentioned embodiment, the cooling fan 143 is formed of a resin mixed with a powdered magnetic material, it may be formed of a resin mixed with a fibrous magnetic material or conductive material.

What we claim is:

1. A brushless motor for a power tool comprising:
   a stator,
   a rotor,
   a drive shaft integrated with the rotor so that said drive shaft rotates with the rotor;
   a cooling fan coupled to said drive shaft, the cooling fan comprising a magnetic material, the cooling fan and the rotor having a coinciding magnetic polarity when rotating with the drive shaft such that rotational position of the cooling fan indicates rotational position of the rotor with respect to the stator;
   the brushless motor is disposed within the power tool, said power tool supplying driving current to the stator, causing the brushless motor to drive a tool bit of the power tool by rotating the rotor.

2. The brushless motor as defined in claim 1, wherein the cooling fan is injection molded of a resin mixed with the magnetic material and/or an electrically conductive material.

3. The brushless motor as defined in claim 1, wherein the cooling fan rotates coaxially with the drive shaft, the cooling fan having a plurality of fan blades extending from the side of the cooling fan opposite to the rotor.

4. The brushless motor as defined in claim 1, wherein the cooling fan is molded of a magnetic material and magnetized such that the cooling fan and the rotor have the same magnetic polarities.

5. A power tool comprising:
   a tool bit,
   a DC brushless motor having a stator, a rotor and a drive shaft, the drive shaft integrated with rotor such that the drive shaft and the rotor rotate together, the brushless motor driving the tool bit via the rotor that is rotated by supplying driving current to the stator and a cooling fan coupled to the drive shaft, the cooling fan rotating to cool the brushless motor, wherein the cooling fan is molded of a magnetic material and/or an electrically conductive material, the cooling fan and the rotor having a coinciding magnetic polarity when the cooling fan and rotor are rotating in the rotational direction of the drive shaft so that the cooling fan also serves as a rotating position detector that detects the rotating position of the rotor with respect to the stator.

6. The power tool as defined in claim 5, wherein the cooling fan is injection molded of a resin mixed with the magnetic material and/or the electrically conductive material.

7. The power tool as defined in claim 5, wherein the cooling fan rotates coaxially with the drive shaft, the cooling fan having a plurality of fan blades extending from the side of the cooling fan opposite to the rotor.

8. The power tool as defined in claim 5, wherein the cooling fan is molded of a magnetic material and magnetized such that the cooling fan and the rotor have the same magnetic polarity.

9. A power tool comprising:

a tool bit, a DC brushless motor including a stator, a rotor and drive shaft integral with the rotor so that the drive shaft rotates with the rotor, the brushless motor driving the tool bit via the rotor, the rotor being rotated by supplying driving current to the stator, a cooling fan coupled to the drive shaft such that rotation of the drive shaft causes cooling of the brushless motor, the cooling fan molded of a magnetic material and/or an electrically conductive material, the cooling fan and the rotor having coinciding magnetic polarities when rotating in the direction of the drive shaft, and a position detector that detects rotating position of the rotor with respect to the stator, wherein the position detector is defined by the cooling fan and a hall element disposed close to the cooling circuit.

10. A method of using a power tool comprising a brushless motor, the brushless motor comprising a stator, a rotor, a shaft and a cooling fan coupled to the drive shaft, the cooling fan cooling the brushless motor when rotating, the cooling fan comprising a magnetic material and/or an electrically conductive material, the magnetic polarity of the cooling fan coinciding with the magnetic polarity of the rotor when the cooling fan is in the same rotational direction as the drive shaft, comprising:

detecting rotating position of the rotor with respect to the stator by detecting the rotating position of the cooling fan.

11. A method of manufacturing a power tool having a cooling fan for cooling a brushless motor, the brushless motor comprising a stator, a rotor and a drive shaft, the drive shaft drivable by the rotor, comprising:

molding the cooling fan of a magnetic and/or an electrically conductive material, coupling the cooling fan to the drive shaft, and magnetizing the cooling fan together with the rotor such that the magnetic polarity of the cooling fan coincides with the magnetic polarity of the rotor when rotating in the direction of the drive shaft, thereby causing the cooling fan to serve as a rotational position detector that detects the rotational position of the rotor with respect to the stator.

12. A brushless motor for a power tool comprising:

a stator, a rotor, a drive shaft integral with the rotor such that the shaft and rotor rotate in unison, a cooling fan molded of a magnetic material and/or an electrically conductive material, the cooling fan coupled to the drive shaft, the cooling fan and the rotor having the same magnetic polarity when rotating in the same direction as the drive shaft, causing the cooling fan to serve as means for detecting rotational position of the rotor with respect to the stator, the brushless motor disposed within the power tool, the power tool supply driving current to the stator to drive a tool bit of the power tool by rotating the rotor.

13. A power tool, comprising:

a tool bit, a DC brushless motor including a stator, a rotor and a drive shaft integral with the rotor so that the drive shaft rotates with the rotor, the brushless motor driving the tool bit via the rotor, the rotor being rotated by supplying driving current to the stator, and a cooling fan coupled to the drive shaft, the cooling fan thereby cooling the brushless motor when the drive shaft rotates, wherein the cooling fan is molded of a magnetic material and/or an electrically conductive material, the cooling fan and the rotor having coincides when rotating in the same direction as the drive shaft, the cooling fan serving as means for detecting a rotating position of the rotor with respect to the stator.

14. A brushless motor for a power tool comprising:

a stator, a rotor, a drive shaft integrated with the rotor so as to rotate together with the rotor, and a cooling fan comprising a resin mixed with a magnetic material and/or an electrically conductive material, the cooling fan coupled to the drive shaft, wherein the cooling fan rotates coaxially with the drive shaft, the cooling fan having a plurality of fan blades extending from the side of the cooling fan opposite to the rotor, the magnetic polarity of the cooling fan coinciding with the magnetic polarity of the rotor when rotating in the direction of the drive shaft such that the cooling fan indicates a rotational position of the rotor with respect to the stator, wherein the brushless motor is disposed within the power tool and supplies driving current to the stator to drive a tool bit of the power tool by rotating the rotor.

15. A power tool, comprising:

a DC brushless motor including a stator, a rotor and a drive shaft integrated with the rotor so as to rotate together with the rotor, the brushless motor driving a tool bit connectable to the power tool via the rotor, the rotor being rotated by supplying driving current to the stator, a cooling fan that rotates to cool the brushless motor, wherein the cooling fan is injection molded of a resin mixed with a magnetic material and/or an electrically conductive material, the cooling fan coupled to the drive shaft such that the cooling fan rotates coaxially with the drive shaft, the cooling fan including a plurality of fan blades extending from the side of the cooling fan opposite to the rotor, the magnetic polarity of the cooling fan coinciding with the magnetic polarity of the rotor when rotating in the direction of the drive shaft, and a position detector that detects rotating position of the rotor with respect to the stator, wherein the position detector is defined by the cooling fan and a hall element disposed closed to the cooling circuit.

* * * * *